United States Patent
Bauer et al.

(10) Patent No.: US 7,258,514 B2
(45) Date of Patent: Aug. 21, 2007

(54) MACHINE TOOL COMPRISING PARALLEL TOOL SPINDLES THAT CAN BE REPOSITIONED IN RELATION TO ONE ANOTHER

(75) Inventors: Walter Bauer, Simmozheim (DE); Timo Remmel, Renchen-Ulm (DE); Helmut Nebeling, Offenburg (DE)

(73) Assignee: Witzig & Frank GmbH (DE)

( * ) Notice: Subject to any disclaimer, the term of this patent is extended or adjusted under 35 U.S.C. 154(b) by 120 days.

(21) Appl. No.: 10/553,610

(22) PCT Filed: Feb. 13, 2004

(86) PCT No.: PCT/EP2004/001339

§ 371 (c)(1),
(2), (4) Date: Oct. 18, 2005

(87) PCT Pub. No.: WO2005/000507

PCT Pub. Date: Jan. 6, 2005

(65) Prior Publication Data
US 2006/0213322 A1 Sep. 28, 2006

(30) Foreign Application Priority Data
Jun. 28, 2003 (DE) ................................ 103 29 402

(51) Int. Cl.
*B23C 1/04* (2006.01)
*B23C 1/08* (2006.01)
*B23B 39/18* (2006.01)

(52) U.S. Cl. ...................... 409/213; 409/200; 408/46; 408/53; 451/464

(58) Field of Classification Search ................ 409/192, 409/203, 213, 217, 199–200, 191, 204, 206, 409/209; 408/31, 42, 46–48, 53; 451/178–179, 451/463, 464, 481
See application file for complete search history.

(56) References Cited

U.S. PATENT DOCUMENTS
3,203,282 A 8/1965 Wilson
(Continued)

FOREIGN PATENT DOCUMENTS
DE 34 868 12/1964
(Continued)

OTHER PUBLICATIONS
Machine translation of EP 811448-A1, along with English Abstracts thereof. 10 pages.*

*Primary Examiner*—Erica Cadugan
(74) *Attorney, Agent, or Firm*—McGlew and Tuttle P.C.

(57) ABSTRACT

A machine tool is provided, in particular for the synchronous machining of workpieces. The tool includes two or more spindle units (2, 3), which run parallel in a machining unit and are designed to hold tools and repositioning devices for the precise adjustment of the position of the spindle units (2, 3) in relation to one another, preferably in all three directions x, y and z of the orthogonal co-ordinate system in the machining unit (4). The repositioning devices for displacing at least one of the spindle units (2, 3), at least in an x and/or y direction, include an eccentric bush (5, 6), which can be rotated about a central shaft (B1, B2) and locked and in which the spindle units (2, 3) are mounted eccentrically, parallel to the central shaft (B1, B2).

16 Claims, 4 Drawing Sheets

U.S. PATENT DOCUMENTS

| | | | | |
|---|---|---|---|---|
| 3,803,981 A | * | 4/1974 | Allgeyer | 409/193 |
| 4,365,916 A | * | 12/1982 | Miyakawa | 408/46 |
| 5,197,836 A | * | 3/1993 | Crivellin | 409/200 |
| 5,378,090 A | * | 1/1995 | Salice | 408/42 |
| 6,099,449 A | * | 8/2000 | Geiger | 483/56 |
| 6,298,531 B1 | * | 10/2001 | Baumbusch et al. | 29/40 |
| 6,361,254 B1 | * | 3/2002 | Vesterlund et al. | 408/1 R |
| 6,382,890 B1 | * | 5/2002 | Linderholm | 409/191 |

FOREIGN PATENT DOCUMENTS

| | | | |
|---|---|---|---|
| DE | 3922776 A1 | * | 1/1991 |
| DE | 198 59 360 | | 7/2000 |
| EP | 0 811 448 | | 12/1997 |
| EP | 0 885 088 | | 12/1998 |
| FR | 2585599 A1 | * | 2/1987 |
| JP | 56-45309 A | * | 4/1981 |
| JP | 58-181503 A | * | 10/1983 |
| JP | 7-204916 A | * | 8/1985 |
| JP | 61-192423 A | * | 8/1986 |
| JP | 62-138515 A | | 6/1987 |
| JP | 62-138515 U | * | 9/1987 |
| JP | 4-122505 A | * | 4/1992 |
| JP | 5-269604 A | * | 10/1993 |
| JP | 6-238503 A | * | 8/1994 |
| WO | WO97/32689 | | 9/1997 |

\* cited by examiner

MACHINE TOOL COMPRISING PARALLEL TOOL SPINDLES THAT CAN BE REPOSITIONED IN RELATION TO ONE ANOTHER

CROSS REFERENCE TO RELATED APPLICATIONS

This application is a United States National Phase application of International Application PCT/EP2004/001339 Feb. 13, 2004 and claims the benefit of priority under 35 U.S.C. § 119 of German Application DE 103 29 402.3 filed Jun. 28, 2003, the entire contents of which are incorporated herein by reference.

FIELD OF THE INVENTION

The invention relates to a machine tool, in particular for the synchronous machining of workpieces, the machine tool being comprised of two or more spindle units which run parallel in a machining unit for reception of tools, and repositioning devices for precise adjustment of the position of the spindle units in relation to one another.

BACKGROUND OF THE INVENTION

In multiple-spindle, synchronous machining of workpieces, e.g. with a double-spindle machining module, the distances between machining spindles might be altered due to different effects, particularly due to thermal expansion. These alterations partly might substantially affect the accuracy in workpiece machining, thus making it impossible to warrant the required accuracy during machining any longer in a process-reliable manner.

As compared with synchronously working machines, therefore, machines with separate drives in one or more axes of the machining units were implemented. Machines of this type, for example, have the general conception of a separate z-axis or a separate y and z-axis. Thus it is possible to warrant process-reliability in critical machining situations with regard to tool lengths. A compensation for position with regard to the distance in the plane normally to the spindle axis, however, cannot be brought about thereby. Another possibility to improve accuracy is executing the machining only with one tool with exact machining operations. But the cycle time of machining is thereby increased quite substantially. In some instances the separate spindles are implemented only to reduce ancillary times. According to that approach, tools are exchanged in one spindle, while the other spindle executes a machining process. Though this principle constitutes a viable possibility for reducing the overall time with short times of engagement in the course of which the machining operations take a time similarly long as that of a tools exchange, but the machine-side expenditure is relatively high as compared with its benefit.

Though EP 885 088 B1 discloses a repositioning of a working spindle in relation to another spindle firmly disposed in a housing, this spindle is disposed in its own U-shaped sledge and equipped with costly repositioning devices (gearbox, ball-type rolling spindle, and belt drive). This repositioning is designed particularly for adapting to different workpieces, i.e. for very large repositioning paths.

Known from the field of turning lathes, too, is a means for adjusting the distance between two spindle units disposed in parallel to each other via a costly ball-type roller spindle for large repositioning paths (JP 62 138 515 U).

DE 198 59 360 A1 discloses a machine tool with a piezoelectrical position correction device, wherein two working spindles are disposed parallel to each other in a machining unit and wherein at least one electrically activated piezoelectrical positioner element is provided for to adjust the distance of the two spindles. The positioner element acts on the housing of the machining unit and can slightly bend apart the two arms which the spindles are affixed to. The positioning path of the piezoelements is very restricted with regard to the existing built space. Besides, the aptness for use of these elements in production machines is critical.

Furthermore, with a multiple-spindle machining, the axial compensation for length of tools (z-direction) should be duly considered. On installation of these tools, they can be adjusted in axial direction only with a certain degree of accuracy, usually measuring their position by the aid of a tool pre-adjustment device and being able to offset values determined with some compensation in a limited range. Here, too, it is only possible with some restrictions to compensate for different lengths of tools. Up to now, these differences can only be realized by utilizing two independent z-axes.

SUMMARY OF THE INVENTION

Now, therefore, it is the object of the present invention to provide a repositioning device for a machine tool according to the general conception of this species in which particularly those problems outlined herein above do not exist and in which particularly an automatic adjustment to the position of the spindle units is made possible in x and/or y direction.

To solve this task it is proposed that the repositioning device for at least one of the spindle units at least in one x and/or y direction be comprised of an eccentric bush rotatable about a central shaft and lockable, in which the spindle units are eccentrically supported parallel to the central axis.

As provided for under the present invention, the two spindles disposed horizontally or vertically in parallel axis to each other can be adjusted independently of each other in x and/or y direction in a simple manner by turning the eccentric bushes, in which they are eccentrically supported, around a definable angle. To this effect, the anti-twist securing and/or clamping means of the eccentric bushes within the stationary bracket is released at first so that the eccentric bushes can be turned and/or so that one of the eccentric bushes can be displaced in axial direction. During machining they are firmly arrested and/or clamped in the bracket. The clamping of the spindle units during machining is accomplished by using a clamping ring in the same manner as for example a belt pulley is fastened on a shaft. Thus it is possible to generate high clamping forces within a very restricted built space and the spindle is kept safely in its position even during severe machining.

The repositioning devices can be approached and activated particularly independent of each other. To adjust the eccentric bushes in x and y direction, the repositioning devices attack the eccentric bushes tangentially outside, with it being possible to drive them mechanically, electrically, or hydraulically. For transformation of the linear drive motion into the required rotary motion of the eccentric bushes, the repositioning devices are provided with frictionally-locked transmission links accommodated in grooves, while retainer bolts are mounted preferably at the eccentric bushes in parallel axis to the spindle axis, with grooved blocks actuated by repositioning cylinders engaging into the retainer bolts. Hence, according to the present invention, conventional hydraulic or mechanical axles are utilized for the repositioning itself. The movement of the positioner elements is reduced once more by the eccentric bushes, thus making it possible to implement a very sensitive repositioning movement.

The movement of the repositioning devices, particularly the movement of grooved blocks disposed at the repositioning cylinders and/or of retainer bolts at the outer periphery of the eccentric bushes is picked-up and recorded by an automatic measuring system. The repositioning path in x and y direction lies in a range of several tenths of a millimeter, preferably in a range from 0.1 to 0.5 mm, and in a range from 0.8 to 5 mm in z-direction, with it being possible to control and regulate the repositioning with an accuracy of <1 µm. As compared with prior art positioner elements based on piezoelectrical actuators, the correction is thereby possible in much broader ranges.

The positioning movement in z-direction can particularly be accomplished by a linearly movable actuator strip, which moves the spindle unit in axial direction via a ring arranged on the spindle housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
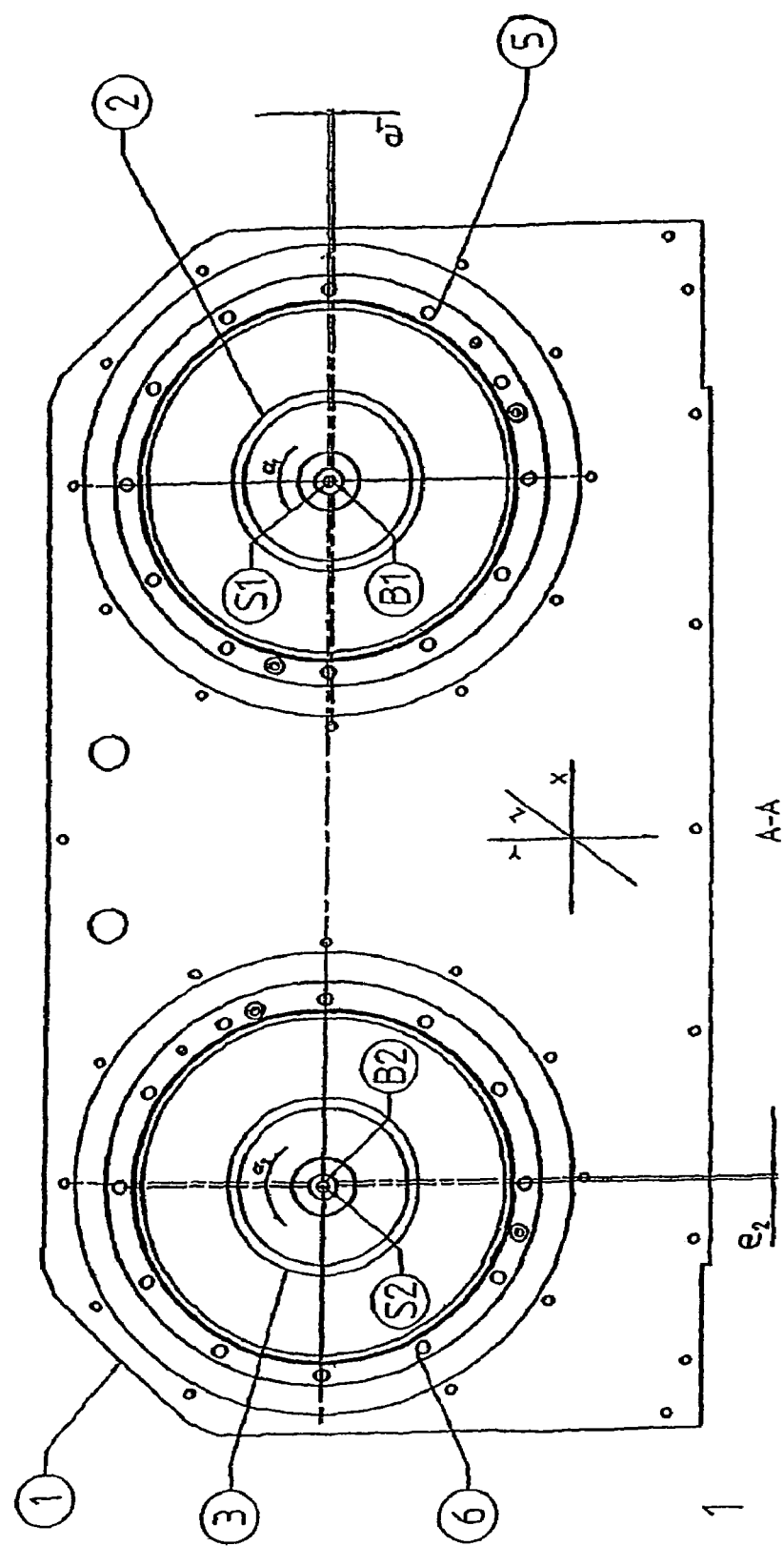
FIG. 1 is a view showing a principle arrangement of two spindle units 2, 3 disposed side by side in parallel axis, demonstrating the efficiency of the eccentric bushes 5, 6 lying in the x-y plane normally to spindle axes B1 and B2.

Referring to the drawings in particular, as schematically shown on FIG. 1, the two spindle units 2 and 3 which are disposed side by side in parallel to each other are firmly arranged eccentrically in an eccentric bush 5, 6 each. The eccentric bushes 5, 6 are mounted in bracket 1 of the machine tool in a bearing pivoting by angles α1 and α2 around central shafts B1 and B2. The central shaft S1 of spindle unit 2, when being in its base position in y-direction, has the eccentricity e1 versus the central shaft B1 of eccentric bush 5, while the central shaft S2 of spindle unit 3 in x-direction has the eccentricity e2 versus the central shaft B2 of eccentric bush 6. By twisting, e.g. eccentric bush 5, within the bracket 1 by an angle α1 around central shaft B1 just by a few angle degrees, the spindle unit 2 is repositioned particularly in x-direction. In the same manner, by twisting the eccentric bush 6, the spindle unit 3 firmly arranged therein is repositioned in y-direction. While the spindle unit 2, when twisted around the central shaft B1, is also repositioned at the same time in y-direction and/or while spindle unit 3, when twisted around central shaft B2, is also repositioned in x-direction, this simultaneous repositioning as a so-called fault of second order is negligible in view of the angles provided for here, preferably just accounting for a few angle degrees.

Figure 2:
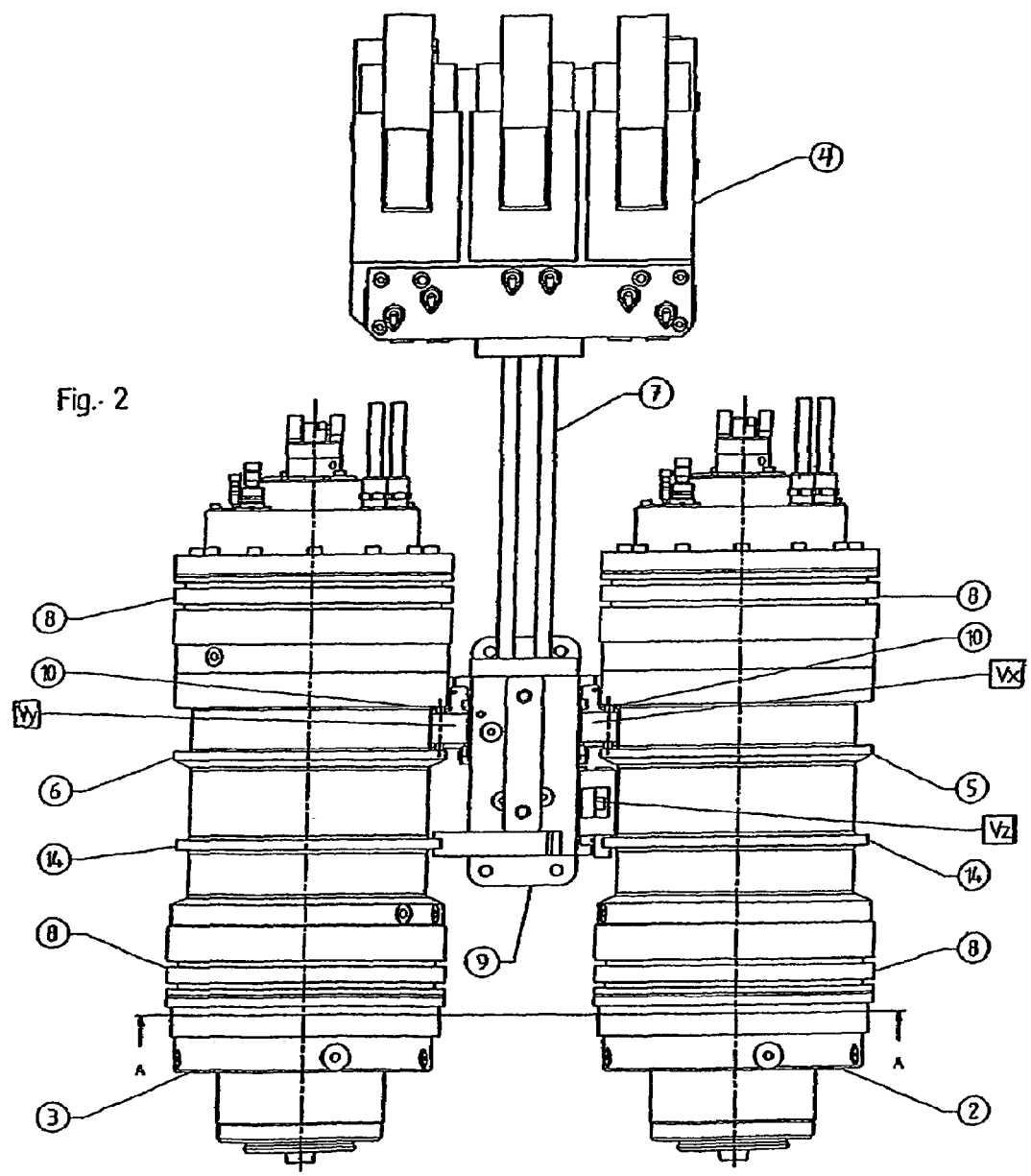
FIG. 2 is a top view on the two side-by-side disposed spindle units 2,3 with the actuator block 9 lying there in between, at which the repositioning devices Vx, Vy, and Vz for repositioning in x, y, and z-direction are arranged.
Figure 3:
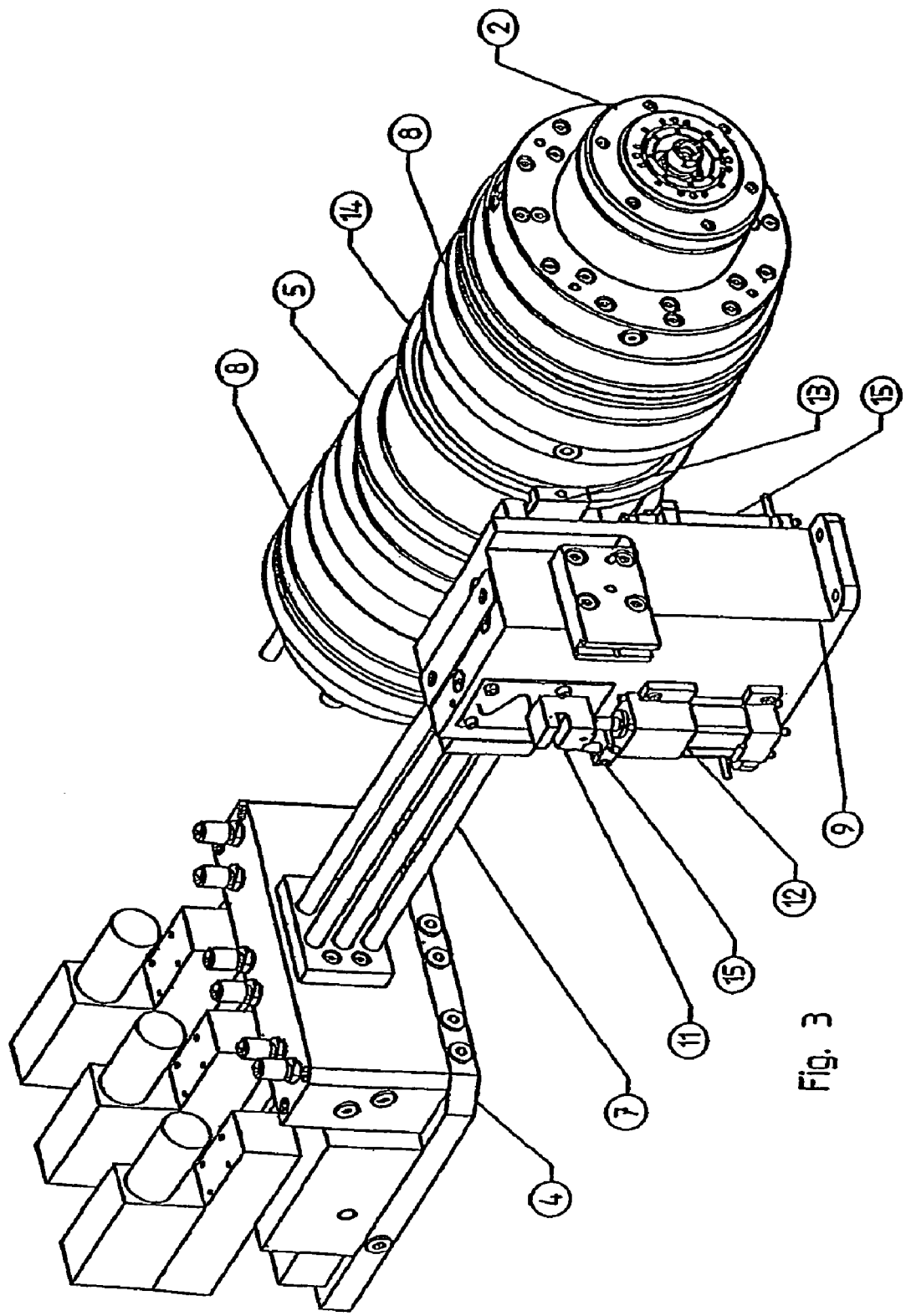
FIG. 3 is a perspective view of a spindle unit 2 and/or 3 of the actuator block 9 and the and 4 pertinent valve block 4.
Figure 4:
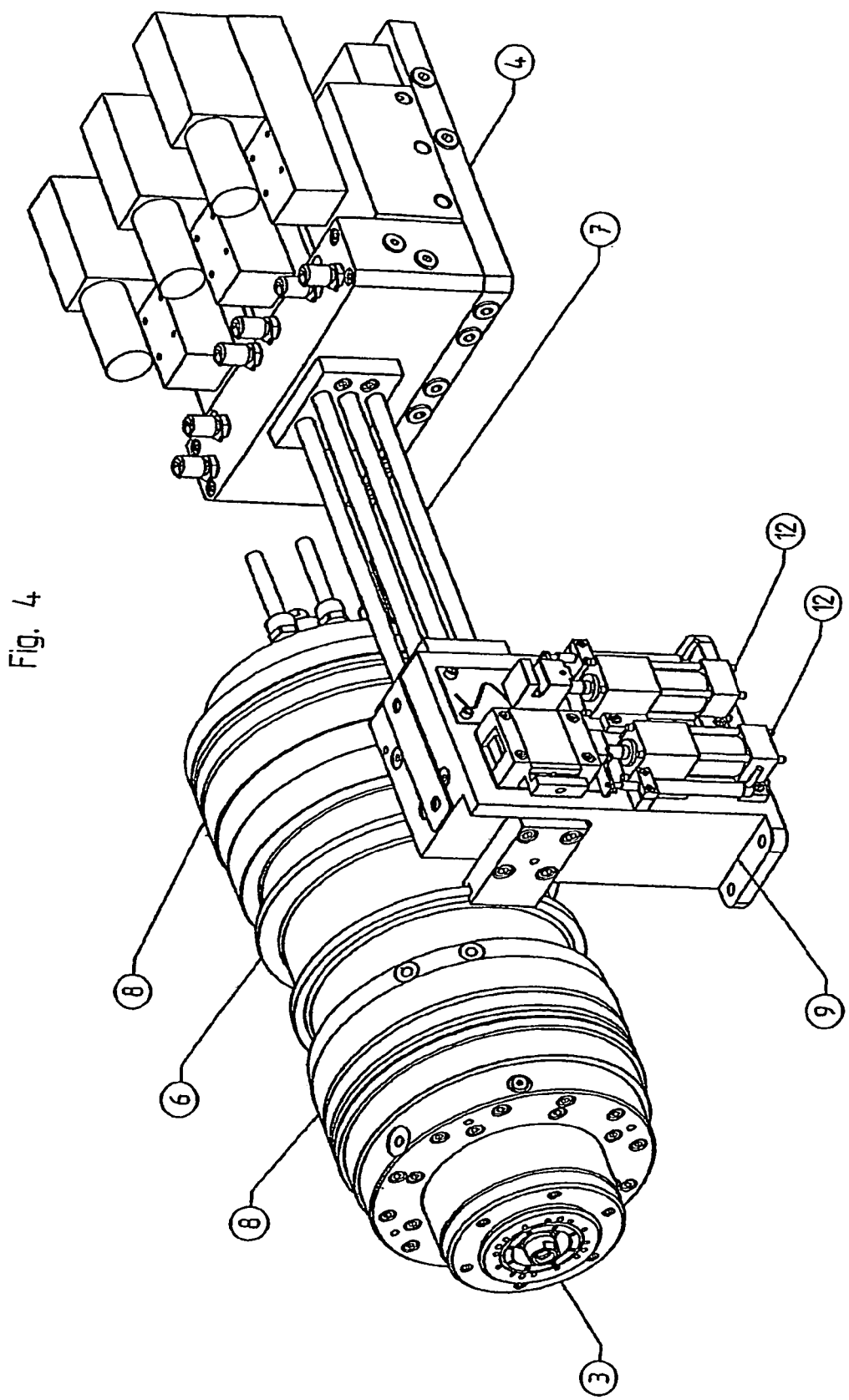
FIG. 4 is a perspective view of a spindle unit 3 with the actuator block 9 and the valve block 4.

FIGS. 2 to 4 show the spindle units 2, 3 with their usual design details, wherein only those elements that are important for the object of the present invention are provided with reference numbers. The eccentric bushes 5,6 with the spindle units 2, 3 firmly disposed therein are secured against twisting and axial displacement by the aid of two prior art clamping rings 8 with bracket 1. Clamping is accomplished hydromechanically. The clamping is released to allow for a repositioning. The repositioning devices Vx, Vy, and Vz each are arranged on a unique repositioning block 9, allocating one repositioning cylinder 12 to each repositioning device, the repositioning cylinder being connected via corresponding hydraulic mains 7 to a valve block 4. FIG. 3 gives an example, showing only the repositioning cylinder 12 for the repositioning device Vx. At the end of the piston of repositioning cylinder 12, a grooved block 11 is arranged there which engages into a retainer bolt 10 mounted externally at the eccentric bush 5. In this manner, the linear movement of the repositioning cylinder 12 is transformed into the rotary movement of the eccentric bush 5. Arranged on the side of repositioning block 5 facing the spindle unit 3 is the repositioning cylinder of repositioning device Vy, which is not shown in these figures. Moreover, the corresponding repositioning cylinder for the repositioning device Vz is not shown as an extra. Of the repositioning device Vz, it is merely the actuator strip 13 which is shown here and which has a groove for the ring 14 disposed on the spindle unit 2. Each repositioning is accomplished without any play.

In designing the machine, all repositioning devices Vx, Vy, and Vz were devised as complete NC axles each having a measuring system 15 of its own in order to allow for a direct measurement of the position of a spindle unit 2, 3 with high position resolution. Conventional control modules are utilized to control the movement of hydraulic repositioning cylinders 12. A direct link of corrective movements to each individual tool is possible. The repositioning of the corrective units is not considered in the machine ancillary time. This repositioning is accomplished in parallel to the other positioning movements during a tool change. On making a correction in length of the tools, in particular, it is possible to deposit and save the corrective values in the NC program. Hence, the corresponding length corrective value is considered when calling up the relevant tool.

To pick-up and record the actual positions of the two spindles in relation to each other, the fabricated workpieces and be measured in off-line mode, while it is also possible to pick-up and record the positions of spindles by way of the measurement scans taken-up by the spindles at certain points of reference. By distributing the correction to both machining spindles, equivalent mechanical properties of both spindles with regard to stiffness are obtained. Furthermore, it is thereby achieved that the entire unit can be accommodated in a minimum built space.

In designing the present invention, considering hitherto known principles, care has been taken to ensure that the repositioning device for the adjustment of spindles can also be retrofitted without substantial expenditure into an existing machine. Hence, the machine properties do not depend on the integration of this unit. With prior art mechanisms, the positioning elements lay directly in the flow of force of the machine and thus influenced the resilience behavior of the machine.

In conformity with the present invention, the constructional elements applied hereunder are accommodated in a well protected space.

While a specific embodiment of the invention has been shown and described in detail to illustrate the application of the principles of the invention, it will be understood that the invention may be embodied otherwise without departing from such principles.

The invention claimed is:

1. A machine tool for the synchronous machining of workpieces, said tool being comprised of:
at least two spindle units, which run parallel in a machining unit for reception of tools; and
repositioning devices for precise adjustment of the position of the spindle units in relation to one another in all three directions x, y, and z of the orthogonal co-ordinate system in the machining unit, wherein the repositioning devices for displacing at least one of the spindle units in at least one of the directions x and/or y each comprise an eccentric bush, which can be rotated about a central axis of the respective bush and locked and in which the rotary tool axes of each of the spindle units are mounted eccentrically relative to the central axis of the respective bush, parallel to said central axes; and wherein each eccentric bush is rotated by a linear movement of a respective piston.

2. A machine tool according to claim 1, wherein said repositioning devices can be activated independently of each other and the repositioning in at least one of the directions x and/or y is executed by rotating said eccentric bushes and is superposed in one of the at least two spindle units by a movement of the one spindle unit in the z-direction.

3. A machine tool according to claim 1, wherein the repositioning devices attack tangentially at the outer rim of said eccentric bushes.

4. A machine tool according to claim 1, wherein the repositioning devices are driven one or more of mechanically, electrically, and hydraulically.

5. A machine tool according to claim 1, wherein the repositioning devices are comprised of retainer bolts disposed parallel to the spindle axis and comprised of groove blocks attacking said retainer bolts and being actuated by repositioning cylinders.

6. A machine tool according to claim 1, further comprising a measuring system for recording the repositioning path of the groove blocks disposed at said repositioning cylinders.

7. A machine tool according to claim 1, wherein the repositioning path in said x, y direction lies in a range from 0.1 to 0.5 mm and in a range from 0.8 to 5 mm in a z-direction.

8. A machine tool according to claim 1, wherein the repositioning can be controlled and regulated with an accuracy of <1 µm.

9. A machine tool for machining of workpieces, the machine tool comprising:
a machining unit;
a first spindle unit having adapted for reception of tools;
a second spindle unit adapted for reception of tools;
a first repositioning device for adjustment of a position of said first spindle unit in relation to said second spindle unit in three directions x, y, and z of the orthogonal co-ordinate system of said machining unit, said first repositioning device comprising a first eccentric bush connected to said machining unit and rotatable about a first central shaft and lockable in a position, said first spindle unit being mounted eccentrically in said first eccentric bush with a first spindle shaft parallel to said first central shaft; and
a second repositioning device for adjustment of a position of said second spindle unit in relation to said first spindle unit in three directions x, y, and z of the orthogonal co-ordinate system of said machining unit, said second repositioning device comprising a second eccentric bush connected to said machining unit and rotatable about a second central shaft and lockable in a position, said second spindle unit being mounted eccentrically in said second eccentric bush with a second spindle shaft parallel to said second central shaft.

10. A machine tool according to claim 9, wherein said each repositioning device is activatable independently of the other and the repositioning in each machining plane is executed by rotating said eccentric bushes and is superposed in one of the two spindle units by a movement in the z-direction.

11. A machine tool according to claim 9, wherein the repositioning devices attack tangentially at the outer rim of said eccentric bushes.

12. A machine tool according to claim 9, further comprising a repositioning device drive that is one of a mechanical drive, an electrical drive and a hydraulic drive.

13. A machine tool according to claim 9, wherein the repositioning devices each include retainer bolts disposed parallel to a respective spindle axis and comprised of groove blocks acting on said retainer bolts and being actuated by repositioning cylinders.

14. A machine tool according to claim 9, further comprising a measuring system for recording a repositioning path of groove blocks disposed at said repositioning cylinders.

15. A machine tool according to claim 9, wherein each repositioning device defines a repositioning path in another x, y direction that lies in a range from 0.1 to 0.5 mm and in a range from 0.8 to 5 mm in said z-direction.

16. A machine tool according to claim 9, wherein each repositioning device provides positional accuracy of <1 µm.

* * * * *